United States Patent
Sato

(10) Patent No.: US 7,573,512 B2
(45) Date of Patent: *Aug. 11, 2009

(54) RECORDING OPERATION CONTROL DEVICE FOR ELECTRONIC STILL CAMERA

(75) Inventor: Koichi Sato, Saitama (JP)

(73) Assignee: Hoya Corporation, Tokyo (JP)

( * ) Notice: Subject to any disclaimer, the term of this patent is extended or adjusted under 35 U.S.C. 154(b) by 694 days.

This patent is subject to a terminal disclaimer.

(21) Appl. No.: 11/157,939

(22) Filed: Jun. 22, 2005

(65) Prior Publication Data

US 2005/0231609 A1    Oct. 20, 2005

Related U.S. Application Data

(62) Division of application No. 09/670,549, filed on Sep. 27, 2000, now Pat. No. 6,919,926.

(30) Foreign Application Priority Data

Sep. 28, 1999  (JP)  ............... P11-273904

(51) Int. Cl.
H04N 5/76  (2006.01)
H04N 5/228  (2006.01)
H04N 5/225  (2006.01)
H04N 5/91  (2006.01)

(52) U.S. Cl. .................. 348/231.99; 386/117; 386/121

(58) Field of Classification Search ............ 348/231.2, 348/231.99, 231.1, 231.6, 372, 333.04; 386/117, 386/126, 121
See application file for complete search history.

(56) References Cited

U.S. PATENT DOCUMENTS 5,032,930 A    7/1991  Suetaka et al.
5,949,950 A    9/1999  Kubo
6,249,313 B1   6/2001  Nishi
6,415,102 B1   7/2002  Fujii et al.
6,549,307 B1   4/2003  Makishima et al.
6,636,264 B1   10/2003 Nakao et al.

(Continued)

FOREIGN PATENT DOCUMENTS

JP    6-086203    3/1994

(Continued)

OTHER PUBLICATIONS

English language Abstract of JP 6-086203.

(Continued)

*Primary Examiner*—John M Villecco
(74) *Attorney, Agent, or Firm*—Greenblum & Bernstein P.L.C

(57) ABSTRACT

A recording operation control device comprises a recording operation stop switch on a rear surface of a camera body of an electronic still camera. By fully depressing a shutter button, a CCD housed in the camera body is exposed so that image data is obtained and recorded in a PC card. If the recording operation stop switch is depressed before the recording operation of the image data is completed, the recording operation is stopped. Instead of depression of the recording operation stop switch, the shutter button may be depressed twice during a constant period of time so that the recording operation is stopped. Both the recording operation stop switch and the shutter button may be depressed to stop the recording operation.

8 Claims, 6 Drawing Sheets

U.S. PATENT DOCUMENTS

| | | | |
|---|---|---|---|
| 6,674,467 B1 | 1/2004 | Lee | |
| 6,686,965 B1 | 2/2004 | Fujii | |
| 6,829,432 B2 * | 12/2004 | Misumi et al. | 348/207.11 |
| 6,930,712 B1 * | 8/2005 | Higuchi et al. | 348/231.99 |
| 2003/0095191 A1 | 5/2003 | Saito | |

FOREIGN PATENT DOCUMENTS

| | | |
|---|---|---|
| JP | 09 135377. | 5/1997 |
| JP | 11-331762 | 11/1999 |
| JP | 11 341426 | 12/1999 |
| JP | 2000 270248 | 9/2000 |
| JP | 2000-276845 | 10/2000 |
| JP | 2001-078131 | 3/2001 |
| JP | 2001 145007 | 5/2001 |

OTHER PUBLICATIONS

English language Abstract of JP 11-331762.
English language Abstract of JP 2000-276845.
English language Abstract of JP 2001-078131.

* cited by examiner

RECORDING OPERATION CONTROL DEVICE FOR ELECTRONIC STILL CAMERA

CROSS REFERENCES TO RELATED APPLICATION

This application is a divisional of prior U.S. application Ser. No. 09/670,549 filed on Sep. 27, 2000, now U.S Pat. No. 6,919,926 which is herein expressly incorporated by reference in its entirety.

BACKGROUND OF THE INVENTION

1. Field of the Invention

The present invention relates to a device, provided in an electronic still camera, to control a recording operation of image data to a recording medium.

2. Description of the Related Art

In an electronic still camera, a shutter button is partly depressed, so that automatic focusing and a photometry are performed, and the shutter button is then fully depressed, so that a photographing operation is performed, in a similar way to a silver halide camera. Namely, by partly depressing the shutter button, a photographing lens is moved on the optical axis so that the photographing lens is set to an in-focus position and an opening degree of an aperture and a shutter speed are calculated. Then, by fully depressing the shutter button, the image data is recorded in a recording medium.

If the shutter button is fully depressed by mistake, while partly depressed to carry out automatic focusing, a photographing is performed, and not only is unwanted image data recorded in the recording medium, but also processing time is taken for the recording operation. Therefore, the next photographing operation cannot be promptly started and a shutter chance may be missed. Also, in automatic exposure mode, if the shutter button is fully depressed by mistake while the lens cap is attached to the photographing lens, it is deemed that the luminance of the object is low, so the exposure period is set for a long time, and the next photographing operation cannot be promptly started, with the same result as the case described above.

SUMMARY OF THE INVENTION

Therefore, an object of the present invention is to provide a recording operation control device, which, even when a shutter release is accidentally carried out, such as a case in which the shutter button is fully depressed by mistake, the recording operation can be promptly canceled.

According to the present invention, there is provided a recording operation control device for an electronic still camera, the device comprising an image data recording processor and a recording operation stopping processor.

The image data recording processor exposes an imaging device to obtain image data and performs a recording operation by which the image data is recorded in a recording medium. The image data recording processor is actuated by depressing a shutter button of the electronic still camera. The recording operation stopping processor stops the recording operation before the recording operation is completed. The recording operation stopping processor is actuated by depressing the shutter button.

Furthermore, according to the present invention, in the recording operation control device, the image data recording processor exposes an imaging device to obtain image data and performs a recording operation by which the image data is recorded in a recording medium. The recording operation stopping processor stops the recording operation before the recording operation is completed.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
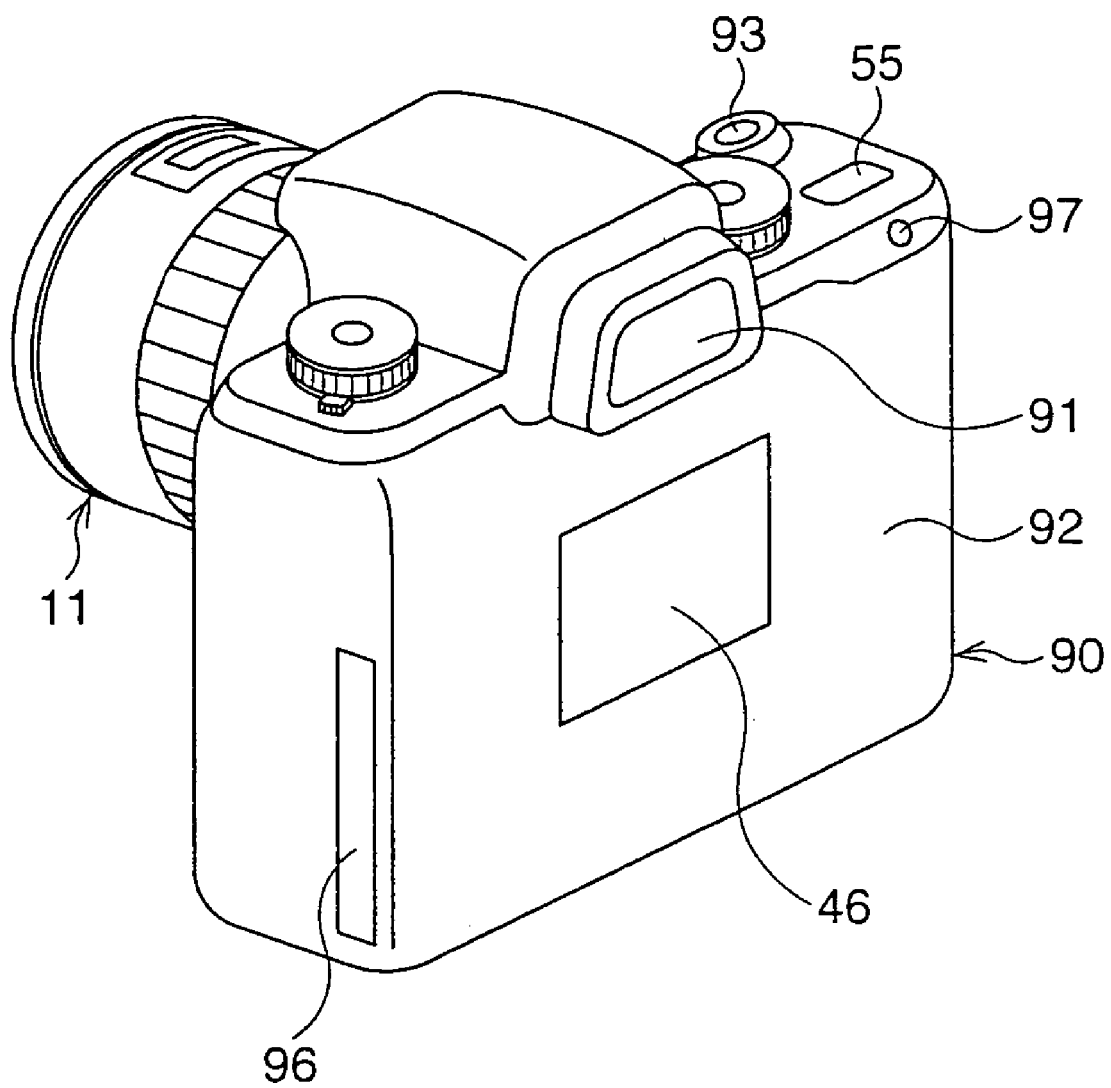
FIG. 1 is a perspective view of an electronic still camera, which is viewed from the back, the camera having a recording operation control device of a first embodiment of the present invention.

The present invention will be described below with reference to the embodiments shown in the drawings.

FIG. 1 is a perspective view of an electronic still camera, which is viewed from the back, the camera having a recording operation control device of a first embodiment of the present invention.

The electronic still camera is a single-lens reflex camera, and an interchangeable lens 11 is detachably connected to the camera body 90. An optical view-finder 91 is provided on the center of the upper surface of the camera body 90. A liquid crystal display panel 46 is provided at the center of the rear surface of the camera body 90, so that a still image, which is stored in a buffer memory 40 (see FIG. 2) by a photographing operation, can be indicated on the liquid crystal display panel 46.

When viewing the camera body 90 from the upper side of the rear surface 92, a shutter button 93 and a condition indicating device 55 are provided on an upper-right portion of the camera body 90. The condition indicating device 55 includes a liquid crystal display panel, by which various kinds of setting conditions of the electronic still camera are indicated by a character or symbol. A recording operation stop switch 97 is provided close to the condition indicating device 55. As described later, the recording operation stop switch 97 is operated so that a photographing operation is stopped prior to completion of the recording operation.

A card slot 96 is formed in a side surface of the camera body 90. The card slot 96 is provided for inserting a recording medium, such as a PC or memory card, into the camera body 90, and a card connector (not shown), to which the recording medium is attached, is provided within the card slot 96.

Figure 2:
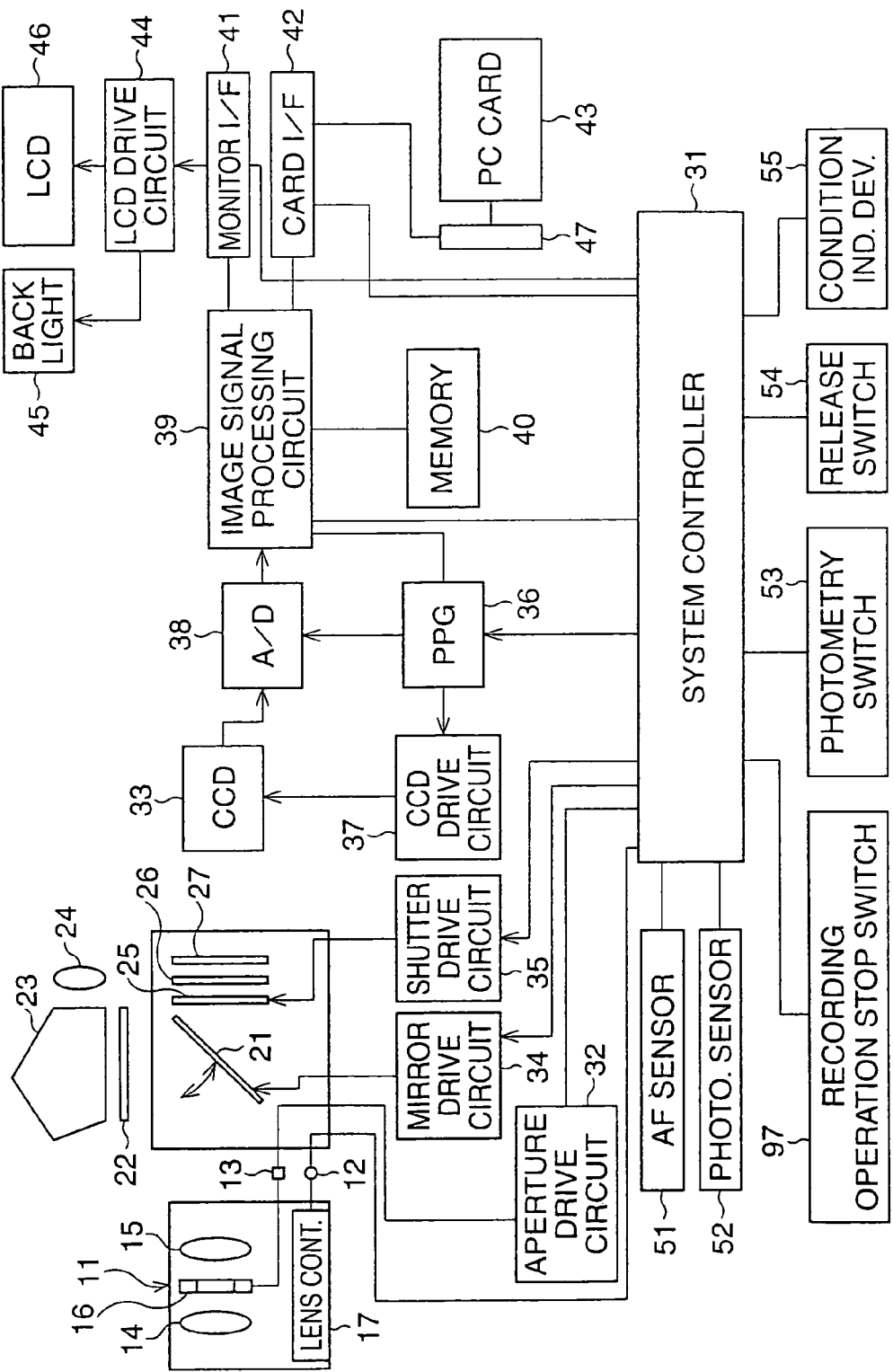
FIG. 2 is a block diagram of the electronic still camera, which shows mainly an electric construction.

FIG. 2 is a block diagram of the electronic still camera, showing mainly an electrical construction.

The interchangeable lens 11 is electrically connected to an electric circuit provided in the camera body 90 (see FIG. 1) through mount pins 12 and 13. A front lens group 14 and a rear lens group 15, which form a photographing optical system of the electronic still camera, are mounted in a lens barrel of the interchangeable lens 11, and an aperture 16 is provided between the lens groups 14 and 15. Each of the lens groups 14 and 15 is displaced in the optical axis direction under control of a lens control circuit 17, so that focusing can be carried out. The lens control circuit 17 is operated in accordance with a control signal transmitted through the mount pin 12 from the system controller 31 provided in the camera body. The aperture 16 is operated in accordance with a control signal transmitted through the mount pin 13 from an aperture drive circuit 32 provided in the camera body, so that the opening degree of the aperture 16 can be adjusted. The aperture drive circuit 32 is controlled by the system controller 31.

In the camera body, a quick return mirror 21 is disposed on the optical axis of the lens groups 14 and 15. The quick return mirror 21 is rotatable between an inclined state shown in the drawing and a horizontal state in which the quick return mirror 21 is rotated upward. A focusing glass 22 is provided above the quick return mirror 21 and a pentagonal prism 23 is arranged above the focusing glass 22. An eyepiece lens 24 of a view-finder is disposed behind the pentagonal prism 23.

A shutter 25 is provided behind the quick return mirror 21, and an infrared cut filter 26 and an optical low-pass filter 27 are arranged behind the shutter 25. A CCD (i.e., an imaging device) 33 is provided behind the optical low-pass filter 27. Namely, the quick return mirror 21, the shutter 25, the infrared cut filter 26 and the CCD 33 are aligned on the optical axis of the lens groups 14 and 15.

A rotating operation of the quick return mirror 21 is driven by a mirror drive circuit 34 and an open-close operation of the shutter 25 is driven by the shutter drive circuit 35. The mirror drive circuit 34 and the shutter drive circuit 35 are controlled by the system controller 31.

Usually, the mirror 21 is set to an inclined state, so that light passing through the interchangeable lens 11 is led to the pentagonal prism 23. In this state, the shutter 25 is closed, so that an optical path to the CCD 33 is closed. Conversely, when a photographing operation is carried out, the mirror 21 is upwardly rotated under control of the mirror drive circuit 34 and set to the horizontal state. With the rotation of the mirror 21, the shutter 25 opens under control of the shutter drive circuit 35, so that light passing through the interchangeable lens 11 is radiated on a light receiving surface of the CCD 33. Namely, an image obtained through the lens groups 14 and 15 is formed on the light receiving surface, and thus, an image signal corresponding to the image is generated in the CCD 33.

A pulse pattern generator (PPG) 36 is connected to the system controller 31 and generates various kinds of pulse signals under control of the system controller 31. Based on these pulse signals, the CCD drive circuit 37, an A/D converter 38 and an image signal processing circuit 39 are driven. The operation of the CCD 33 is controlled by the CCD drive circuit 37. Namely, the image signal read from the CCD 33 is converted to digital image data by the A/D converter 38, and is then subjected to a predetermined process by the image signal processing circuit 39. A buffer memory 40, having a capacity large enough to store a frame of digital image data, is connected to the image signal processing circuit 39.

A monitor interface 41 and a card interface 42 are connected to the image signal processing circuit 39. These interfaces 41 and 42 are controlled by the system controller 31. A back light 45 and the liquid crystal display panel (LCD) 46 are connected to the monitor interface 41 through a liquid crystal display drive circuit 44. Based on the image data read from the buffer memory 40, the liquid crystal display drive circuit 44 is controlled so that the still image is indicated by the liquid crystal display panel 46, as described above. A card connector 47 is connected to the card interface 42, and a PC card 43 is attached to the card connector 47.

An AF sensor 51 and a photometry sensor 52 are connected to the system controller 31. The AF sensor 51 has a known construction, by which the focusing condition of the lens groups 14 and 15 is sensed. A photometry is performed using the photometry sensor 52, so that the opening degree of the aperture 16 for the exposure and an electric charge accumulation period (i.e., an exposure period) of the CCD 33 are determined.

The photometry switch 53, the release switch 54 and the condition indicating device 55 are connected to the system controller 31. The photometry switch 53 is turned ON by partly depressing the shutter button 93 so that a photometry is carried out by the photometry sensor 52. The release switch 54 is turned ON by fully depressing the shutter button 93, hence activating the mirror drive circuit 34 and the shutter drive circuit 35 as previously described. Namely, the CCD 33 is exposed, and thus an image signal corresponding to the image is generated in the CCD 33.

The recording operation stop switch 97 is connected to the system controller 31.

Figure 3A:
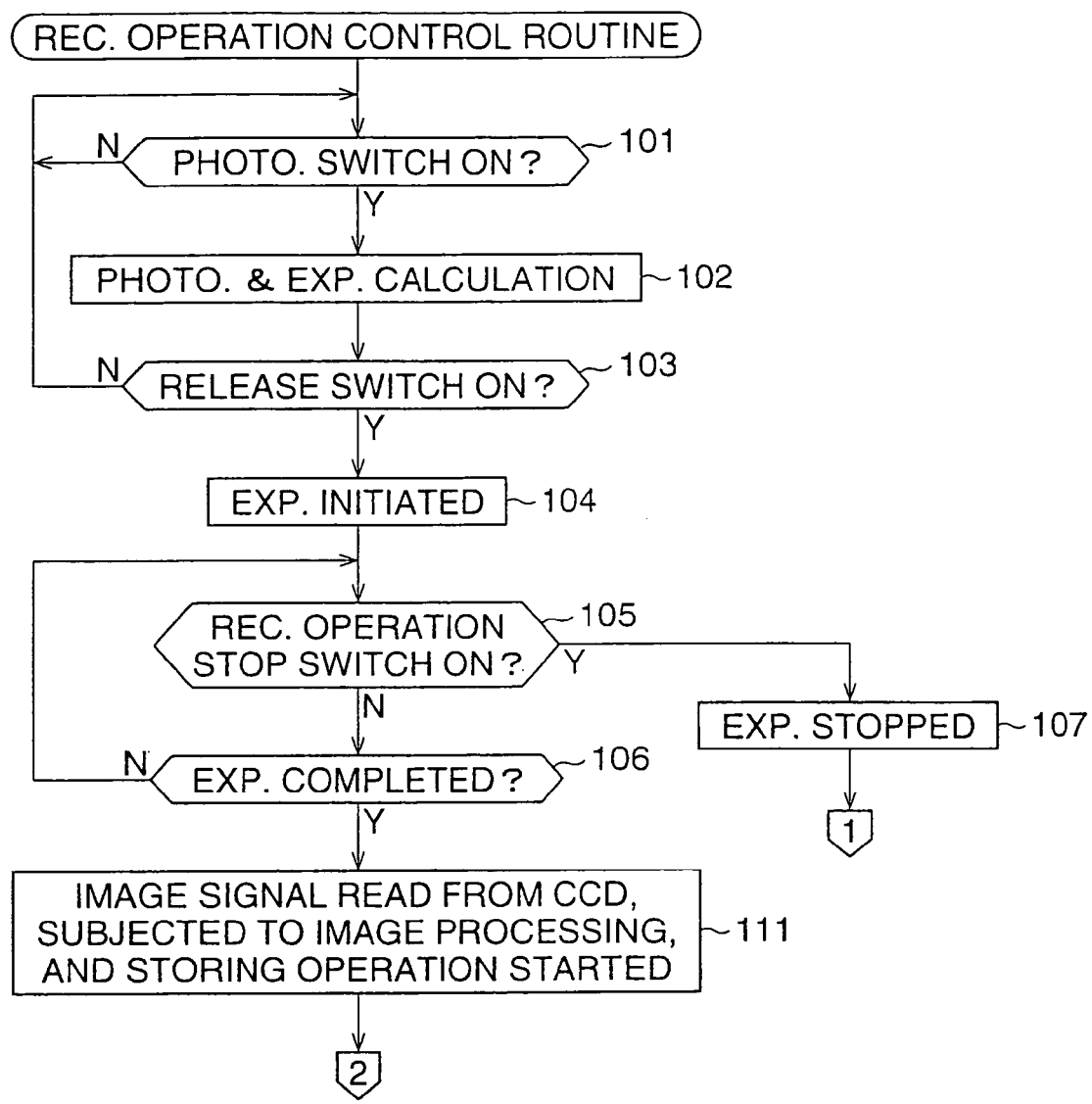
FIGS. 3A and 3B show a flow chart of a photographing operation control routine.
Figure 3B:
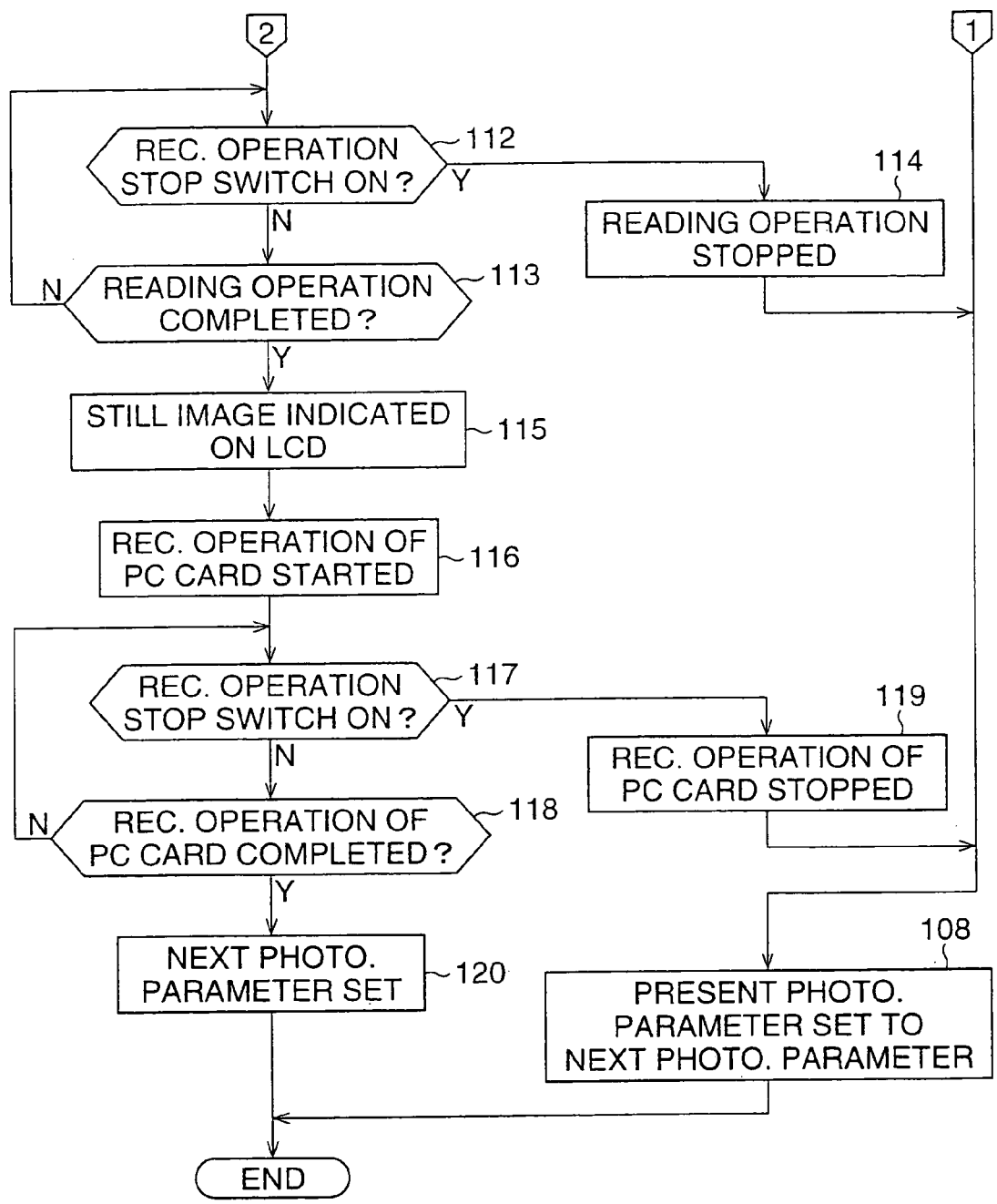

FIGS. 3A and 3B show a flow chart of a recording operation control routine of the electronic still camera. The recording operation control routine is executed in the system controller 31 and is started by turning ON a main switch (i.e., an electric power switch of the electronic still camera).

In Step 101, it is determined whether the photometry switch 53 is turned ON. When the photometry switch 53 is changed to the ON-position, Step 102 is executed, in which a photometry and an exposure calculation are performed. Namely, based on a photometry value obtained by the photometry sensor 52, the opening degree of the aperture 16 and the exposure period (i.e., a shutter speed) are determined. At the same time, the lens groups 14 and 15 are moved in the optical axis direction so that focusing is performed. In Step 103, it is determined whether the release switch 54 is turned ON. When it is determined that the release switch 54 is not turned ON, the process goes back to Step 101, and the operations described above are executed again. Conversely, when it is determined that the release switch 54 is changed to the ON-position, the process goes to Step 104.

In Step 104, an exposure is initiated, so that the CCD 33 is exposed. The quick return mirror 21 is rotated upward to the horizontal state, and the opening degree of the aperture 16 is set to a value previously calculated in Step 102. The shutter 25 is then opened, and thus the exposure is initiated. In Step 105, it is determined whether the recording operation stop switch 97 is depressed to set to the ON state. When the recording operation stop switch 97 is not depressed, Step 106 is executed in which it is determined whether the exposure has been completed. Hence, it is determined whether the exposure period calculated in Step 102 has passed, and when it is determined that the exposure time has not passed, the process goes back to Step 105.

If the recording operation stop switch 97 is depressed while Steps 105 and 106 are repeatedly executed, the process goes to Step 107, in which the recording operation is stopped. Namely, the quick return mirror 21 is rotated downward to the inclined state, and the shutter 25 is closed so that the exposure of the CCD 33 is stopped. Then, in Step 108, the present photographing parameter such as the frame number of the image data, which would have been recorded in the PC card 43 in the recording operation stopped in Step 107, is set to the next photographing parameter of image data, which is to be recorded in the next recording operation. The recording operation control routine then ends.

On the other hand, when it is determined in Step 106 that the exposure has been completed, Step 111 is executed. In Step 111, the quick return mirror 21 is rotated to the inclined state and the shutter 25 is closed so that the exposure of the CCD 33 ends. Then, an image signal is read from the CCD 33 and converted into digital image data in the A/D converter 38.

The digital image data is subjected to a predetermined image process in the image signal processing circuit 39, and a storing operation of the digital image data in the buffer memory 40 is started. In Step 112, it is determined whether the recording operation stop switch 97 is set to the ON-position. While the recording operation stop switch 97 is not depressed, Step 113 is executed, in which it is determined whether the reading operation of the image signal from the CCD 33 has been completed, and when it is determined that the reading operation has not been completed, the process then goes back to Step 112.

While Steps 112 and 113 are repeatedly executed, if the recording operation stop switch 97 is depressed, the process goes to Step 114, in which a stop process of the reading operation of the image signal is performed. Then, Step 108 is executed, so that the operations described above are executed to end the recording operation control routine.

If it is determined in Step 113 that the reading operation has been completed, Step 115 is executed, in which the image data is read from the buffer memory 40 and, based on the image data, a still image is indicated on the liquid crystal display panel 46. In Step 116, a recording operation of the image data to the PC card 43 is started. In Step 117, it is determined whether the recording operation stop switch 97 is set to an ON-state. While the recording operation stop switch 97 is not depressed, Step 118 is executed, in which it is determined whether the recording operation of the PC card 43 has been completed and, if not, the process then goes back to Step 117.

While Steps 117 and 118 are repeatedly executed, if the recording operation stop switch 97 is depressed, the process goes to Step 119, in which the image signal to the PC card 43 is stopped. Then, Step 108 is executed, so that the operations described above are performed, and the recording operation control routine ends.

When it is determined in Step 118 that the recording operation of the PC card 43 has been completed, the process goes to Step 120, in which a photographing parameter such as the frame number of the image data, which will be recorded in the next photographing operation, is set, and the recording operation control routine ends.

As described above, in the first embodiment, even if the shutter button 93 is fully depressed by mistake, or even if the shutter button 93 is fully depressed by mistake while the lens cap is attached to the photographing lens, the recording operation can be stopped before the recording operation of the image data to the PC card 43 is completed by depressing the recording operation stop switch 97. Namely, if the exposure period has not elapsed, the exposure is stopped in Step 107. Further, if the reading operation of the image signal from the CCD 33 is being carried out, the reading operation of the image signal is stopped in Step 114, and if the recording operation of the PC card 43 is being carried out, the recording operation is stopped in Step 119. Therefore, since unwanted image data is not recorded in the PC card 43 and the next recording operation can be immediately started, a missed shutter chance is prevented.

Figure 4:
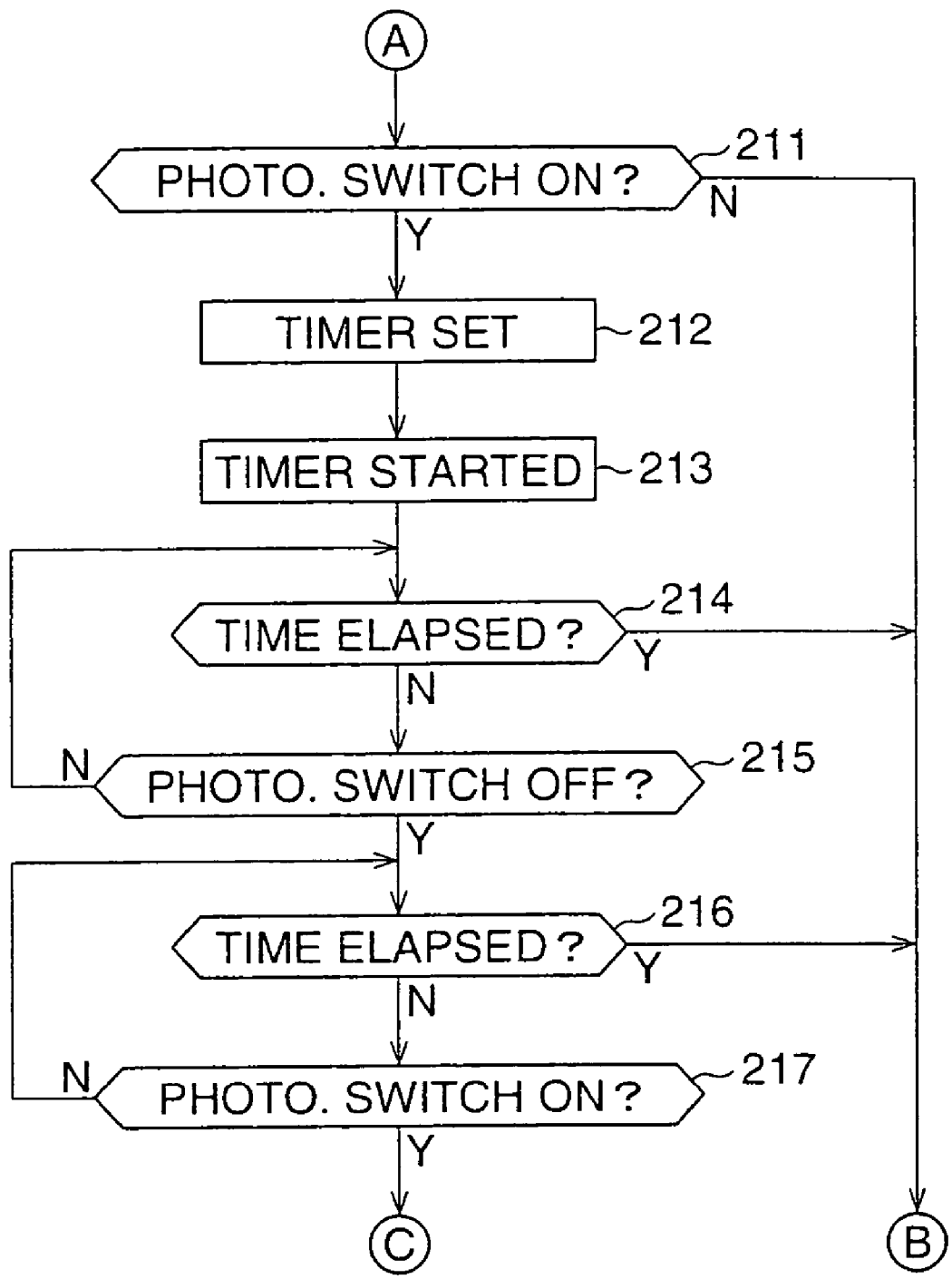
FIG. 4 is a flow chart of a main part of a recording operation control routine of a second embodiment.

FIG. 4 is a flow chart of a main part of a recording operation control routine of a second embodiment. The second embodiment is constructed in such a manner that the photometry switch 53, i.e. the shutter button 93, functions as the recording operation stop switch. In the second embodiment, the other constructions are the same as those of the first embodiment.

Steps 211 through 217 can be set instead of, or replaced with, Steps 105, 112 and 117 shown in FIGS. 3A and 3B. Reference "A" indicates the Step executed immediately before Step 211. Reference B indicates a Step which is executed when it is determined in Step 211 that the recording operation stop switch is turned OFF, or when it is determined in Step 214 or 216 that a predetermined time has passed. When Steps 211 through 217 replace Step 105 of FIG. 3A, reference "B" is Step 106. Reference "C" indicates a Step, which is executed when it is determined in Step 217 that the photometry switch 53 is turned ON, and is Step 107 when Steps 211 through 217 replace Step 105 of FIG. 3A.

In Step 211, it is determined whether the photometry switch is turned ON. When the photometry switch is set to the OFF-position, the process goes to Step of reference "B", and when the photometry switch is set to the ON-position, the process goes to Step 212. In Step 212, a timer is set to a predetermined value (0.2 sec, for example).

In Step 213, clocking by the timer is started. In Step 214, it is determined whether the predetermined time set in Step 212 has elapsed. When the time has not elapsed, the process goes to Step 215 in which it is determined whether the photometry switch 53 is turned OFF. When the photometry switch 53 is turned ON, the process goes back to Step 214. If the time has elapsed while Steps 214 and 215 are repeatedly executed, it is deemed that the recording operation stop switch has not been operated and the process goes to Step "B".

Although the contents of Steps 216 and 217 are basically the same as those of Steps 214 and 215, when it is determined in Step 217 that the photometry switch 53 is turned ON, it is deemed that the recording operation stop switch has been operated and the process goes to Step "C" so that the recording operation is stopped.

As described above, in the second embodiment, when the photometry switch 53 (i.e., the shutter button 93) is depressed twice during a constant period in a recording operation, similar to a double-click of a mouse in a computer, the recording operation is stopped. Therefore, according to the second embodiment, similar effects to the first embodiment are obtained.

Figure 5:
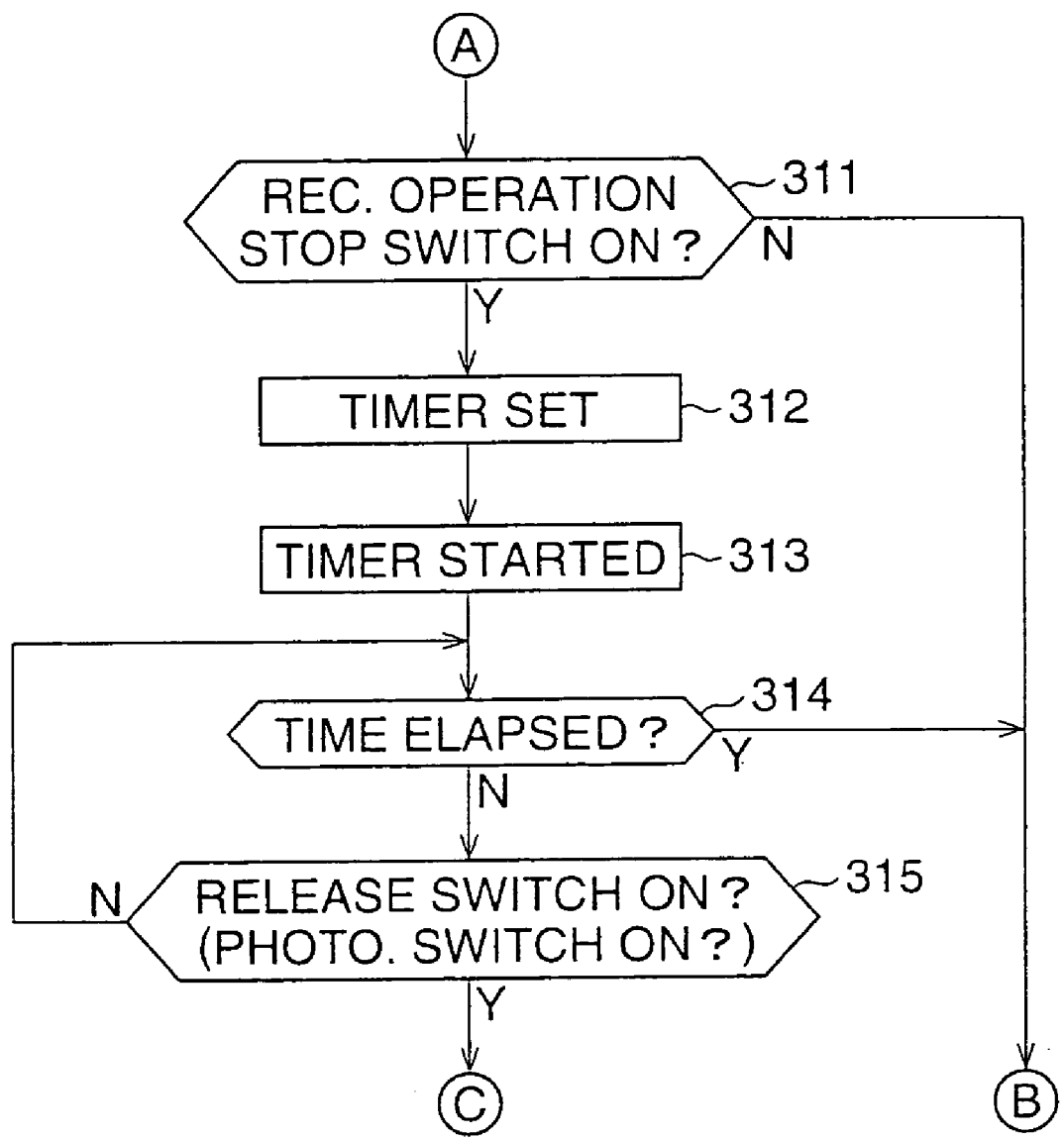
FIG. 5 is a flow chart of a main part of a recording operation control routine of a third embodiment.

FIG. 5 is a flow chart of a main part of a recording operation control routine of a third embodiment. The third embodiment is constructed in such a manner that both the recording operation stop switch 97 and the shutter button 93 are operated to stop the recording operation. In the third embodiment, the other constructions are the same as those of the first embodiment.

Steps 311 through 315 can be set instead of Steps 105, 112 and 117 shown in FIGS. 3A and 3B. Reference "A" indicates the Step executed immediately before Step 311. Reference "B" indicates a Step which is executed when it is determined in Step 311 that the recording operation stop switch 97 is turned OFF, or when it is determined in Step 314 that a predetermined time has elapsed. When Steps 311 through 315 are replaced with Step 105 of FIG. 3A, reference "B" is Step 106. Reference "C" indicates a Step which is executed when it is determined in Step 315 that the release switch 54 (or the photometry switch 53) is turned ON, and is Step 107 when Steps 311 through 315 are replaced with Step 105 of FIG. 3A.

In Step 311, it is determined whether the recording operation stop switch 97 is turned ON. When the recording operation stop switch 97 is set to the OFF-position, the process goes to Step "B", and when the recording operation stop switch 97 is set to the ON-position, the process goes to Step 312. In Step 312, a timer is set to a predetermined value (for example, 5 sec).

In Step 313, clocking by the timer is started. In Step 314, it is determined whether the predetermined time set in Step 312 has elapsed. When the time has not elapsed, the process goes to Step 315, in which it is determined whether the release switch 54 (or the photometry switch 53) is turned ON. When the release switch 54 (or the photometry switch 53) is turned OFF, the process goes back to Step 314. If the time has elapsed while Steps 314 and 315 are repeatedly performed, it is deemed that the recording operation stop switch has not been operated and the process goes to Step "B".

If it is determined that the release switch 54 (or the photometry switch 53) is turned ON during the execution of Steps 314 and 315, the process goes to Step "C" so that the recording operation is stopped.

As described above, in the third embodiment, the recording operation stop switch 97 and the shutter button 93 are depressed during a constant period of time in a recording operation, so that the recording operation is stopped. Therefore, according to the third embodiment, similar effects to the first embodiment are obtained.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. 11-273904 (filed on Sep. 28, 1999) which is expressly incorporated herein, by reference, in its entirety.

The invention claimed is:

1. A recording operation controller for an electronic still camera, comprising:
   an image data recording processor that exposes an imaging device to obtain image data and performs a recording operation in automatic mode by which said image data is recorded in a recording medium, said image data recording processor being actuated by depressing a shutter button of said electronic still camera; and
   a recording operation stopping processor that terminates said recording operation in automatic mode while said recording operation in automatic mode is being executed and before said recording operation in automatic mode is completed, said recording operation stopping processor being actuated by depressing said shutter button, and said recording operation comprising:
   the exposing of said imaging device, a reading operation which reads an image signal from said imaging device, and a storing operation which stores said image signal in said recording medium,
   wherein said exposing of said imaging device, said reading operation and said storing operation are performed sequentially and automatically to completion when said recording operation stopping processor is not actuated, and
   wherein when said recording operation stopping processor is actuated said recording operation is terminated.

2. The recording operation controller according to claim 1, wherein said recording operation is terminated, after said recording operation is started, by depressing again said shutter button.

3. The recording operation controller according to claim 1, further comprising a photographing parameter setting processor that, when said recording operation stopping processor terminates said recording operation, sets a first photographing parameter of first image data which would be recorded in said terminated recording operation, as a second photographing parameter of second image data which is to be recorded in a next recording operation.

4. A recording operation controller for an electronic still camera, comprising:
   an image data recording processor that exposes an imaging device to obtain image data and performs a recording operation in automatic mode by which said image data is recorded in a recording medium, said image data recording processor being actuated by depressing a shutter button of said electronic still camera; and
   a recording operation stopping processor that terminates said recording operation in automatic mode while said recording operation in automatic mode is being executed and before said recording operation in automatic mode is completed, said recording operation stopping processor being actuated by operating a recording operation stopping switch which is other than said shutter button, said recording operation comprising:
   the exposing of said imaging device, a reading operation which reads an image signal from said imaging device, and a storing operation which stores said image signal in said recording medium,
   wherein said exposing of said imaging device, said reading operation and said storing operation are performed sequentially and automatically to completion when said recording operation stopping processor is not actuated by said recording operation stopping switch, and
   wherein said recording operation stopping processor is actuated said recording operation is terminated.

5. The recording operation controller according to claim 4, wherein said recording operation is terminated by operating both of said recording operation stopping switch and said shutter button.

6. The recording operation controller according to claim 4, wherein said recording operation stopping processor stops an exposure to said imaging device.

7. The recording operation controller according to claim 4, wherein said recording operation stopping processor stops a reading operation in which an image signal generated in said imaging device is read from said imaging device.

8. The recording operation controller according to claim 4, further comprising a photographing parameter setting processor that, when said recording operation stopping processor terminates said recording operation, sets a first photographing parameter of first image data which would be recorded in said terminated recording operation, as a second photographing parameter of second image data which is to be recorded in a next recording operation.

* * * * *